(12) United States Patent
Calo et al.

(10) Patent No.: US 7,895,653 B2
(45) Date of Patent: Feb. 22, 2011

(54) INTERNET ROBOT DETECTION FOR NETWORK DISTRIBUTABLE MARKUP

(75) Inventors: Seraphin B. Calo, Cortlandt Manor, NY (US); Kang-Won Lee, Nanuet, NY (US); Kyoungsoo Park, West Windsor, NJ (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 11/756,075

(22) Filed: May 31, 2007

(65) Prior Publication Data

US 2008/0301808 A1 Dec. 4, 2008

(51) Int. Cl.
*G06F 11/00* (2006.01)
(52) U.S. Cl. .............................. 726/23; 726/22; 726/25
(58) Field of Classification Search ................... 726/23, 726/22, 25
See application file for complete search history.

(56) References Cited

PUBLICATIONS

Game Bot Detection via Avatar Trajectory Analysis; Pao, H.-K.; Chen, K.-T.; Chang, H.-C.; Computational Intelligence and AI in Games, IEEE Transactions on; vol. 2 , Issue: 3; Publication Year: 2010 , pp. 162-175.*
An Audio CAPTCHA to Distinguish Humans from Computers; Haichang Gao; Honggang Liu; Dan Yao; Xiyang Liu; Aickelin, U.; Electronic Commerce and Security (ISECS), 2010 Third International Symposium on; Publication Year: 2010 , pp. 265-269.*
Sentinel: Hardware-Accelerated Mitigation of Bot-Based DDoS Attacks; Djalaliev, P.; Jamshed, M.; Farnan, N.; Brustoloni, J.; Computer Communications and Networks, 2008. ICCCN '08. Proceedings of 17th International Conference on; Publication Year: 2008 , pp. 1-8.*
Captchas.net; http://www.captchas.net.
Kandula, S., et al; Surviving Organized DDOS Attacks that Mimic Flash Crowds; In Proceedings of the 2nd Symposium on Networked Systems Design and Implementation (NSDI '05), 2005.
Robertson, W., et al; Using Generalization and Characterization Techniques in the Anomaly Based Detection of Web Attacks; In Proceedings of the 13th Annual Network and Distributed System Security Symposium (NDSS '06), 2006.

(Continued)

*Primary Examiner*—David Y Jung
(74) *Attorney, Agent, or Firm*—Scott Paul, Esq.; Carey Rodriguez Greenberg Paul, LLP

(57) ABSTRACT

Embodiments of the present invention provide a method, system and computer program product for bot detection for network distributable markup. In accordance with an embodiment of the present invention, a page request for distributed markup can be processed to incorporate embedded fragment within the requested page. For instance, the fragment can include a script enabled to detect human activity within the requested page such as a mouse movement. Alternatively, the fragment can include an extraneous markup artifact. The requested page subsequently can be returned to the requestor and the embedded fragment can be monitored to detect the presence of a bot depending upon the activation of the artifact. For example, where human activity can be detected within the page or where the extraneous markup artifact becomes activated despite the extraneous nature of the artifact, a human requestor can be concluded. However, where no human activity is detected in the requested page, or where the extraneous markup artifact remains unactivated, a bot requestor can be determined.

15 Claims, 2 Drawing Sheets

OTHER PUBLICATIONS

Robot Exclusion Protocol; http://www.robotstxt.org/wc/exclusion.html.

Schapire, R.; The Boosting Approach to Machine Learning: An Overview; Nonlinear Estimation and Classification, 2003.

Tan, P., et al; Discovery of Web Robot Sessions Based on their Navigational Pattern; Data Mining and Knowledge Discovery; 6:9-35, 2002.

Trusted Computing Group; http://www.trustedcomputinggroup.org.

Von Ahn, L., et al; Using Hard AI Problems for Security; In Proceedings of Eurocrypt; pp. 294-311, 2003.

Wang, L., et al; Reliability and Securityin the CoDeeN Content Distribution Network; In Proceedings of the UNENIX Annual Technical Conference, 2004.

* cited by examiner

INTERNET ROBOT DETECTION FOR NETWORK DISTRIBUTABLE MARKUP

BACKGROUND OF THE INVENTION

1. Field of the Invention

The present invention relates to the field of network security and more particularly to Internet robot detection for network distributable markup.

2. Description of the Related Art

Computing security has increasingly become the focus of information technologists who participate in locally and globally accessible computer networks. In particular, with the availability and affordability of network computing, even within the small enterprise, many small computer networks provide continuous access to private content for global users via network distributable content including Web content and markup in general. Notwithstanding, the efficiencies gained, network computing is not without its price. Specifically, those computers and computer networks which heretofore had remained disconnected from the security risks of the Internet now have become the primary target of malicious Internet hackers, crackers and script kiddies, collectively referred to as "malicious attackers".

Computing networks incorporate gateway switches to regulate the ingress and egress of information into different segments of the network. Firewall technologies have been deployed in association with gateway switches in order to impede the penetration of a computing network by a malicious hacker. Generally, a firewall inspects incoming packets of data in order to detect patterns of information known to be associated with the activities of a malicious hacker. The patterns can be detected statically by referencing a known table of patterns, or dynamically according to the stateful inspection of packets. Most effectively, firewall technologies can limit the type of traffic flowing through a network domain simply by blocking all ports other than those ports expressly intended to permit unimpeded traffic flow.

While port blocking can be effective for many garden variety attacks, some ports must remain open to allow unimpeded flow of information intended for public dissemination over the global Internet—namely network distributable markup like Web pages. Malicious attacks occur with respect to network distributable markup in a number of ways, including Web page defacement. One particular attack type of concern, however, can be subtle and undetectable, though the consequences can be substantial. Specifically an Internet robot or Web robot, hereinafter a "bot", has been the vehicle of choice for malicious hackers intent upon proactively collecting information relating to network distributable content and for probing vulnerabilities in a supporting platform.

Strictly speaking, a bot is a computer software application including program code enabled to run automated tasks over a computer communications network like the global Internet. Typically, bots perform tasks that are both simple and structurally repetitive, at a much higher rate than would be possible for a human end user alone. For example, Web spidering utilizes bots to retrieve and analyze content from network distributable markup. In a Web spidering bot, an automated script fetches, analyzes and files information from Web servers at many times the speed of a human end user. Web spidering can be beneficial in some circumstances, such as in search engine cataloging of content. To that end, Web servers attempt to manage Web spidering by publishing a robots.txt file that incorporates locally adopted rules for Web spidering to be obeyed by a visiting Web spider. Additionally, a Web spider as part of accepted Internet etiquette publishes its presence within the user agent field of a content request.

The malicious use of bot technology, however, often outweighs the beneficial aspects of Web spidering. In particular, malicious users often use bot technology to harness compromised hosts to flood Web sites with distributed denial of service attacks. Malicious users additionally use bot technology to repetitively send requests to a Web site using forged referrer headers in order to create trackback links intended to inflate the search engine rankings of the Web site. Malicious users yet further use bot technology to generate automated click-throughs for online advertisements to boost affiliate revenue. Finally, malicious users use bot technology to harvest e-mail addresses for use in the transmission of unsolicited commercial e-mail, e.g. "spam".

BRIEF SUMMARY OF THE INVENTION

Embodiments of the present invention address deficiencies of the present art with respect to bot use for Web spidering, and provide a novel and non-obvious method, system and computer program product for bot detection for network distributable markup. In one embodiment of the invention, a bot detection method can be provided as in the following. The method can include embedding an activatable fragment within requested network distributable markup and determining the presence of a human actor interacting with the network distributable markup in response to receiving an activation signal emitted from the embedded activatable fragment. Conversely, the presence of a bot interacting with the network distributable markup can be determined in response to failing to receive an activation signal from the embedded activatable fragment.

In one aspect of the embodiment, embedding an activatable fragment within requested network distributable markup can include configuring instructions in a script to respond to human activity in the requested network distributable markup by emitting an activation signal to a source of the network distributable markup, and embedding the script within the requested network distributable markup. As such, configuring instructions in a script to respond to human activity in the requested network distributable markup by emitting an activation signal to a source of the network distributable markup can include configuring instructions in a script to respond to either mouse movements or keyboard strokes in the requested network distributable markup by emitting an activation signal to a source of the network distributable markup.

In another aspect of the embodiment, embedding an activatable fragment within requested network distributable markup can include configuring a link to an extraneous resource to emit an activation signal upon activation by a content browser rendering the requested network distributable markup, and embedding the extraneous resource within the requested network distributable markup. In this regard, configuring a link to an extraneous resource to emit an activation signal upon activation by a content browser rendering the requested network distributable markup, can include configuring a link to an extraneous resource such as an activatable link to an empty content style sheet, an activatable link to a transparent pixel, or an activatable link to empty audio.

In another embodiment of the invention, a content distribution data processing system can be configured for bot detection. The system can include a content server configured to distribute Web pages to requesting clients and bot detection logic. The bot detection logic can include program code enabled to embed an activatable fragment within a requested Web page and to determine the presence of a human actor interacting with the requested Web page in response to receiving an activation signal emitted from the embedded activatable fragment. The program code further can be enabled to determine the presence of a bot interacting with the requested Web page in response to failing to receive an activation signal from the embedded activatable fragment. In one aspect of the embodiment, the activatable fragment can include instructions in a script to respond to human activity, while in another aspect of the embodiment, the fragment can include a link to an extraneous resource.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for bot detection for network distributable markup. In accordance with an embodiment of the present invention, a page request for distributable markup can be processed to incorporate an embedded fragment within the requested page. For instance, the fragment can include a script enabled to detect human activity within the requested page such as mouse movement. Alternatively, the fragment can include an extraneous markup artifact. The requested page subsequently can be returned to the requestor and the embedded fragment can be monitored to detect the presence of a bot depending upon the activation of the artifact. For example, where human activity can be detected within the page or where the extraneous markup artifact becomes activated despite the extraneous nature of the artifact, a human requestor can be concluded. However, where no human activity is detected in the requested page, or where the extraneous markup artifact remains unactivated, a bot requestor can be determined.

Figure 1:
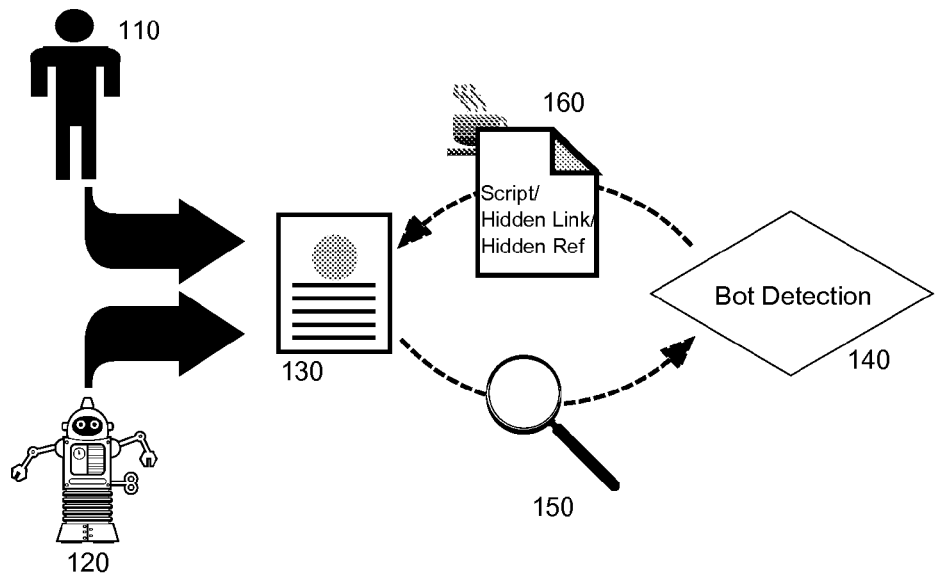
FIG. 1 is a pictorial illustration of a content delivery system configured for bot detection for network distributable markup.

In a more particular illustration, FIG. 1 depicts a content delivery system configured for bot detection for network distributable markup. As shown in FIG. 1, network distributable markup 130 can be provided for access both by a human actor 110 and a bot 120. Whereas access by a human actor 110 can be preferred, access by a bot 120 can be undesirable, and detecting access by a bot 120 can be provided. In particular, an embedded fragment 160 can be incorporated into the network distributable markup 130 and the activation 150 of the fragment 160 can be monitored by bot detection logic 140 in order to resolve whether a human actor 110 or a bot 120 has accessed the network distributable markup.

In this regard, the embedded fragment 160 can include a script including program code enabled to respond to a mouse movement event by emitting an activation signal 150 able to be detected by the bot detection logic 140. Alternatively, the embedded fragment 160 can include a link or reference to an extraneous resource configured to emit an activation signal 150 in response to its selection. In the former circumstance, the emission of an activation signal 150 can indicate to the bot detection logic 140 the presence of a human actor 110, while the failure to detect an activation signal 150 can indicate to the bot detection logic 140 the presence of a bot 120. Likewise, in the latter circumstance, the emission of an activation signal 150 can indicate the presence of an ordinary content browser that normally loads all artifacts irrespective of the extraneous nature of any given artifact, and hence a human actor 110, while the failure to detect an activation signal 150 can indicate the presence of a bot 120 efficiently configured to ignore extraneous artifacts like references to presentation related resources including audio and visual materials and content style sheets.

Figure 2:
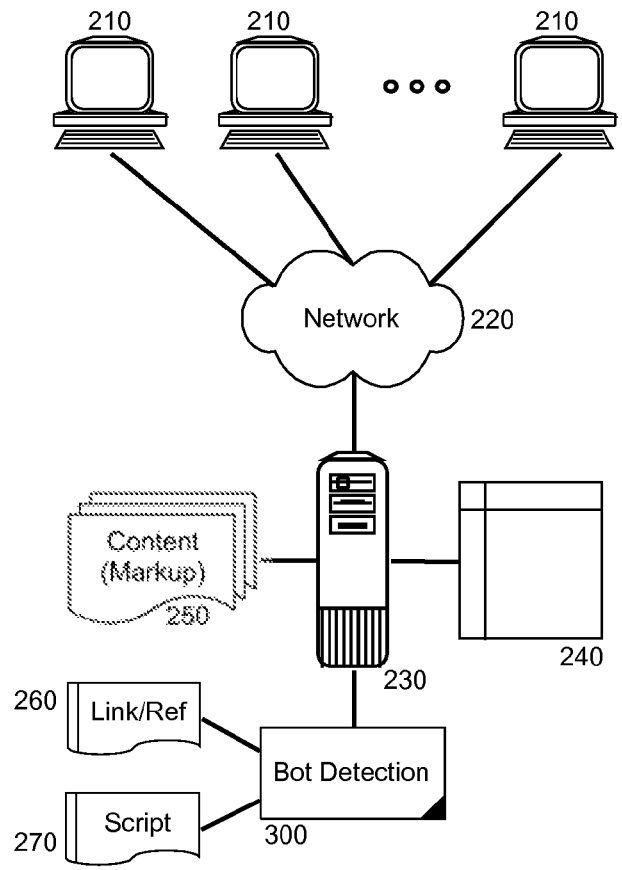
FIG. 2 is a content distribution data processing system configured for bot detection for network distributable markup; and, FIGS. 3A and 3B, taken together, are a flow chart illustrating a process for bot detection for network distributable markup.

The content delivery system of FIG. 1 can be embodied within a content distribution data processing system over a computer communications network such as the global Internet. In illustration, FIG. 2 depicts a content distribution data processing system configured for bot detection for network distributable markup. The system of FIG. 2 can include a content server 230 configured for communicative coupling to one or more client computing requestors 210 over computer communications network 220. Each of the client computing requestors 210 can be configured to support interactions with the content server 230 over the computer communications network at the behest of a human actor, or a bot.

The content server 230, for example a Web server, can be programmed to respond to requests for content 250 from the client computing requestors 210 by serving requested content 250, including Web pages and other markup language documents, to requesting ones of the client computing requestors 210. Coupled bot detection logic 300, however, can cooperate with the content server 230 to detect access to served content 250 on behalf of a bot rather than a human actor. To that end, the bot detection logic 300 can include program code that has been enabled to modify the content 250 with an embedded fragment, for example a reference to an extraneous artifact 260, or a human activity detection script 270.

Specifically, an activatable link to an extraneous presentation information such as an empty content style sheet, or an activatable reference to an extraneous resource such as silent audio or a one by one (1×1) transparent pixel, or a hidden link, can be embedded in the content 250. In so far as the activatable link or the activatable reference is extraneous in nature, the activatable link or the activatable reference can be hidden from view of the human actor and can have no appreciable impact on the presentation of the content 250 in a content browser. Yet, a bot likely will ignore extraneous presentation information out of programmatic efficiency as the bot spiders the content 250. Accordingly, upon detecting the activation of a link or reference to the extraneous artifact, the program code of the bot detection logic 300 can be enabled to determine the presence of a human actor in accessing the content 250.

By comparison, the human activity detection script 270 can be provided to respond to a human activity event such as mouse movement or keyboard input. The human activity detection script 270 can be arranged to emit an activation signal upon detecting human activity and the bot detection logic 300, upon receiving the emitted activation signal can determine the presence of a human actor rather than a bot. Optionally, the emitted activation signal can include a dynamically determined key provided within the human activity detection script 270 by the bot detection logic 300. For example, the key can be incorporated into a network address for an extraneous resource reference to be returned to the content server 230 as the emitted activation signal. As such, the human activity detection script 270 can appear to the unwitting observer as a routine script to fetch a resource in response to receiving a human activity event such as a mouse movement or keyboard stroke.

Notably, prior to serving the content 250 containing the human activity detection script 270, the key can be computed by the program code of the bot detection logic 300. In one aspect of the embodiment, the key can be computed randomly and stored in association with the requesting one of the client computing requesters 210 in a table of keys 240. Each record in the table of keys can include a reference to a page requester, for instance by Internet protocol (IP) address, a page identifier for a requested page, and a key value. In this way, the authenticity of the emitted activation signal can be assured by comparing the key within the emitted activation signal with a corresponding key in the table of keys 240 for the requested content 250 by the requesting one of the client computing requestors 210.

Figure 3A:
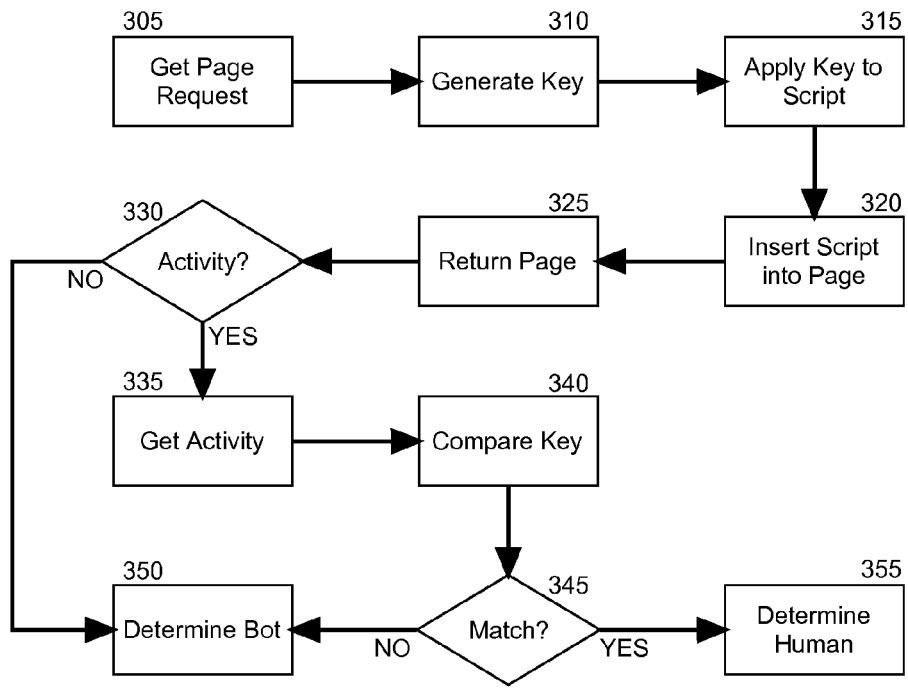
Figure 3B:
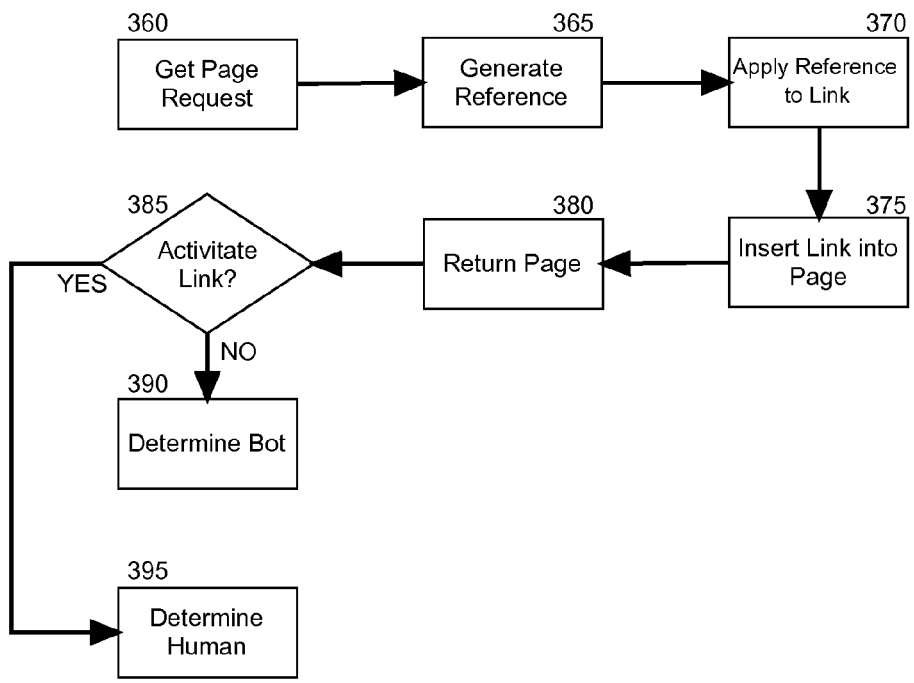

In yet further illustration, FIGS. 3A and 3B, taken together, are a flow chart illustrating a process for bot detection for network distributable markup. In particular, FIG. 3A illustrates a process for bot detection utilizing an embedded human activity detection script, while FIG. 3B illustrates a process for bot detection utilizing an embedded, hidden link or hidden reference. Considering first FIG. 3A, beginning in block 305, a page request can be received for markup distributable content such as a Web page. In block 310, a key can be generated and stored in a table in association with a requester and the requested page. Thereafter, in block 315, the key can be incorporated into a human activity detection script enabled to respond to a human activity event by emitting an activation signal including the generated key. Finally, the script can be inserted into the requested page in block 320 and the page can be returned to the requester in block 325.

In decision block 330, it can be determined whether an activation signal has been emitted from the page. If not, the presence of a bot can be determined in block 350. However, if in decision block 330 it is determined that an activation signal has been emitted from the page, in block 335, the activation signal 335 can be received and the key within the activation signal can be extracted for processing in block 340. Specifically, the key from within the activation signal can be compared to a key for the requester and the page. In decision block 345, it can be determined whether the keys match. If not, the presence of a bot can be determined in block 350. Otherwise, the presence of a human actor can be determined in block 355.

Turning now to FIG. 3B, a process for bot detection utilizing an embedded, link or reference to an extraneous artifact is shown. Beginning in block 360 a page request can be received for markup distributable content such as a Web page. In block 365, an extraneous reference to a resource can be generated and in block 370, the extraneous reference can be incorporated into a link. The link, in turn, can be inserted into a requested page in block 375 and the page can be returned to a requestor of the page in block 380. Thereafter, in decision block 385, if the link does not become activated, in block 390 the presence of a bot can be determined. Otherwise, in block 395 the presence of a human actor can be determined. In an alternative circumstance, however, the activation of the link can indicate the presence of a bot where the extraneous link is a user-activatable hidden hyperlink unlikely to be activated by a human actor due to the hidden nature of the hyperlink, whereas a bot is likely to activate the hyperlink when spidering to a page referenced by the hidden hyperlink.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A bot detection method comprising:
   embedding an activatable fragment within requested network distributable markup, the embedded activatable fragment configured to emit an activation signal in response to a presence of a human actor; and
   determining a presence of a bot interacting with the network distributable markup in response to failing to receive the activation signal from the embedded activatable fragment, wherein
   the activatable fragment includes a script that responds to a mouse movement by emitting the activation signal.

2. The method of claim 1, wherein the activation signal is a network address incorporating a key.

3. The method of claim 1, wherein
   the embedding the activatable fragment comprises:

configuring a link to an extraneous resource to emit the activation signal upon activation by a content browser rendering the requested network distributable markup; and embedding the extraneous resource within the requested network distributable markup.

4. The method of claim 3, wherein the configuring the link comprises configuring a hidden hyperlink to other network distributable markup to emit the activation signal.

5. The method of claim 4, wherein the presence of the bot interacting with the network distributable markup is determined in response to receiving an activation signal emitted from the hidden hyperlink.

6. A computer program product comprising a computer usable storage medium having stored therein computer usable program code for bot detection, the computer usable program code, which when executed by a computer hardware system, causes the computer hardware system to perform embedding an activatable fragment within requested network distributable markup, the embedded activatable fragment configured to emit an activation signal in response to a presence of a human actor; and determining a presence of a bot interacting with the network distributable markup in response to failing to receive the activation signal from the embedded activatable fragment, wherein the activatable fragment includes a script that responds to a mouse movement by emitting the activation signal.

7. The method of claim 6, wherein the activation signal is a network address incorporating a key.

8. The computer program product of claim 6, wherein the embedding the activatable fragment, comprises:

computer usable program code for configuring a link to an extraneous resource to emit the activation signal upon activation by a content browser rendering the requested network distributable markup; and computer usable program code for embedding the extraneous resource within the requested network distributable markup.

9. The computer program product of claim 8, wherein the configuring the link comprises configuring a hidden hyperlink to other network distributable markup to emit the activation signal.

10. The computer program product of claim 9, wherein the presence of the bot interacting with the network distributable markup is determined in response to receiving an activation signal emitted from the hidden hyperlink.

11. A bot detection method comprising:

embedding an activatable fragment within requested network distributable markup, the embedded activatable fragment configured to emit an activation signal in response to a presence of a human actor; and determining a presence of a bot interacting with the network distributable markup, wherein the activatable fragment includes a script that responds to human activity by emitting an activation signal including a network address incorporating a key;

the determining the presence of the bot comprises comparing the key with a key pre-stored in association with a requester of the network distributable markup and the network distributable markup, and the presence of the bot is determined upon the keys not matching.

12. A bot detection method comprising:

embedding an activatable fragment within requested network distributable markup, the embedded activatable fragment configured to emit an activation signal in response to a presence of a human actor; and determining a presence of a bot interacting with the network distributable markup in response to failing to receive the activation signal from the embedded activatable fragment, wherein the embedding the activatable fragment comprises:

configuring a link to an extraneous resource to emit the activation signal upon activation by a content browser rendering the requested network distributable markup, and embedding the extraneous resource within the requested network distributable markup, and the extraneous resource is selected from the group consisting of an activatable link to an empty content style sheet, an activatable link to a transparent pixel, and an activatable link to empty audio.

13. A content distribution data processing hardware system configured for bot detection, the system comprising:

a content server configured to distribute Web pages to requesting clients; and, bot detection logic comprising program code configured to embed an activatable fragment within a requested Web page, the embedded activatable fragment configured to emit an activation signal in response to a presence of a human actor, and determine a presence of a bot interacting with the requested Web page in response to failing to receive the activation signal from the embedded activatable fragment wherein the activatable fragment includes a script that responds to a mouse movement by emitting the activation signal.

14. A computer program product comprising a computer usable storage medium having stored therein computer usable program code for bot detection, the computer usable program code, which when executed by a computer hardware system, causes the computer hardware system to perform embedding an activatable fragment within requested network distributable markup, the embedded activatable fragment configured to emit an activation signal in response to a presence of a human actor; and determining a presence of a bot interacting with the network distributable markup, wherein the activatable fragment includes a script that responds to human activity by emitting an activation signal including a network address incorporating a key;

the determining the presence of the bot comprises comparing the key with a key pre-stored in association with a requester of the network distributable markup and the network distributable markup, and the presence of the bot is determined upon the keys not matching.

15. A computer program product comprising a computer usable storage medium having stored therein computer usable program code for bot detection, the computer usable program code, which when executed by a computer hardware system, causes the computer hardware system to perform embedding an activatable fragment within requested network distributable markup, the embedded activatable fragment configured to emit an activation signal in response to a presence of a human actor; and determining a presence of a bot interacting with the network distributable markup in response to failing to receive the activation signal from the embedded activatable fragment, wherein the embedding the activatable fragment comprises:

configuring a link to an extraneous resource to emit the activation signal upon activation by a content browser rendering the requested network distributable markup, and embedding the extraneous resource within the requested network distributable markup, and the extraneous resource is selected from the group consisting of an activatable link to an empty content style sheet,
an activatable link to a transparent pixel, and
an activatable link to empty audio.

\* \* \* \* \*